Nov. 21, 1933.     H. LINDENBERGER     1,936,332
MOLDING APPARATUS
Filed Feb. 13, 1931     6 Sheets-Sheet 2
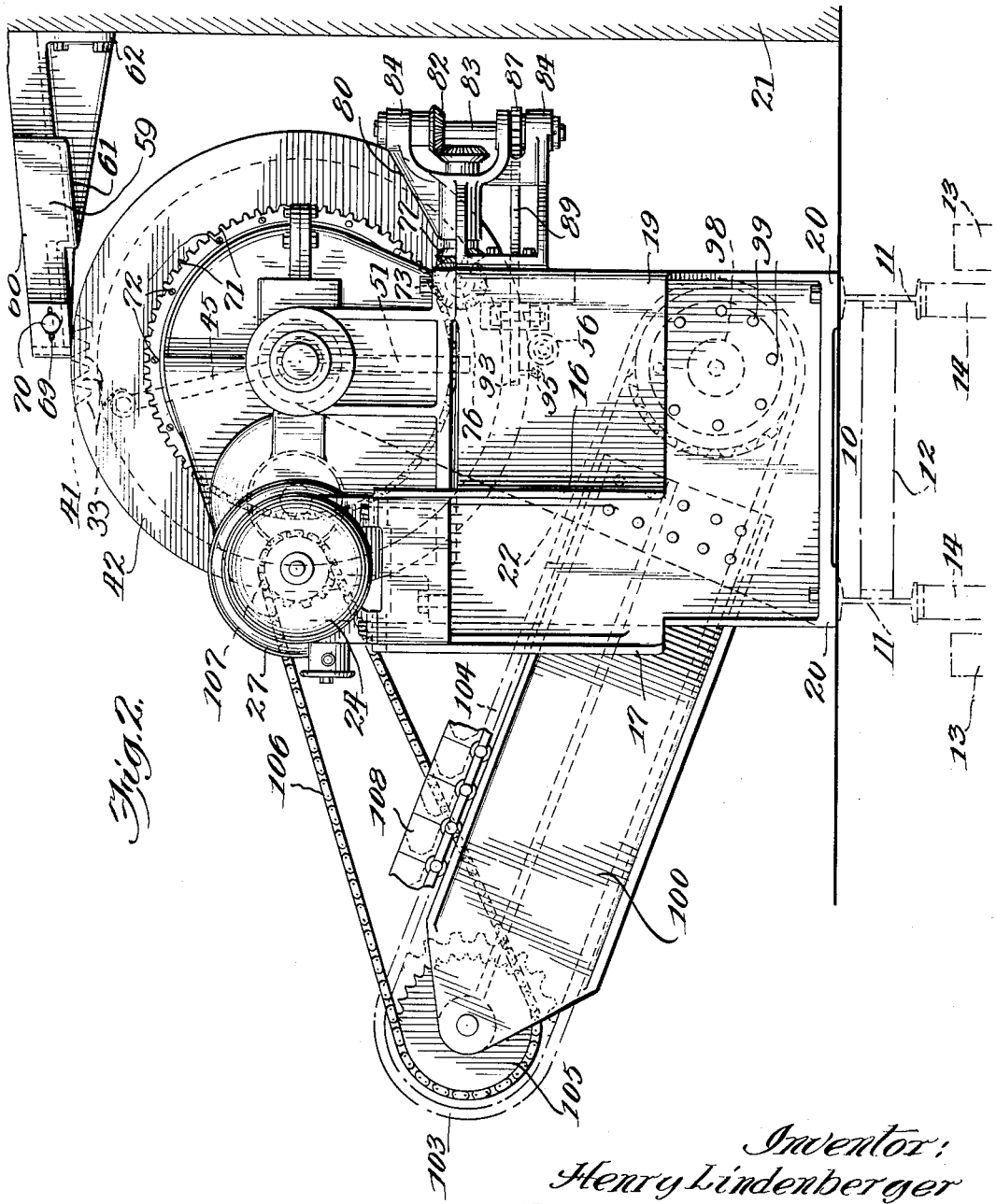

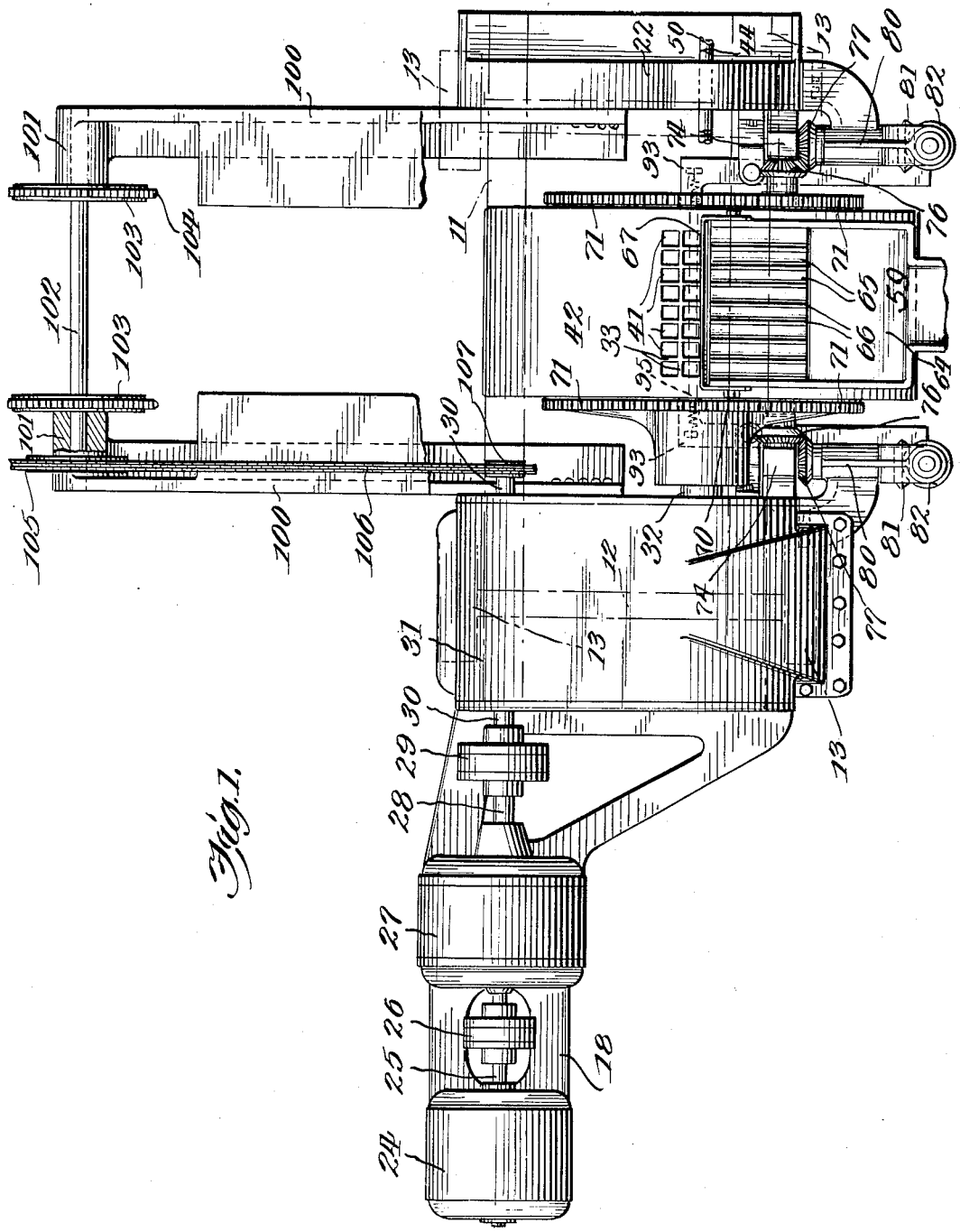

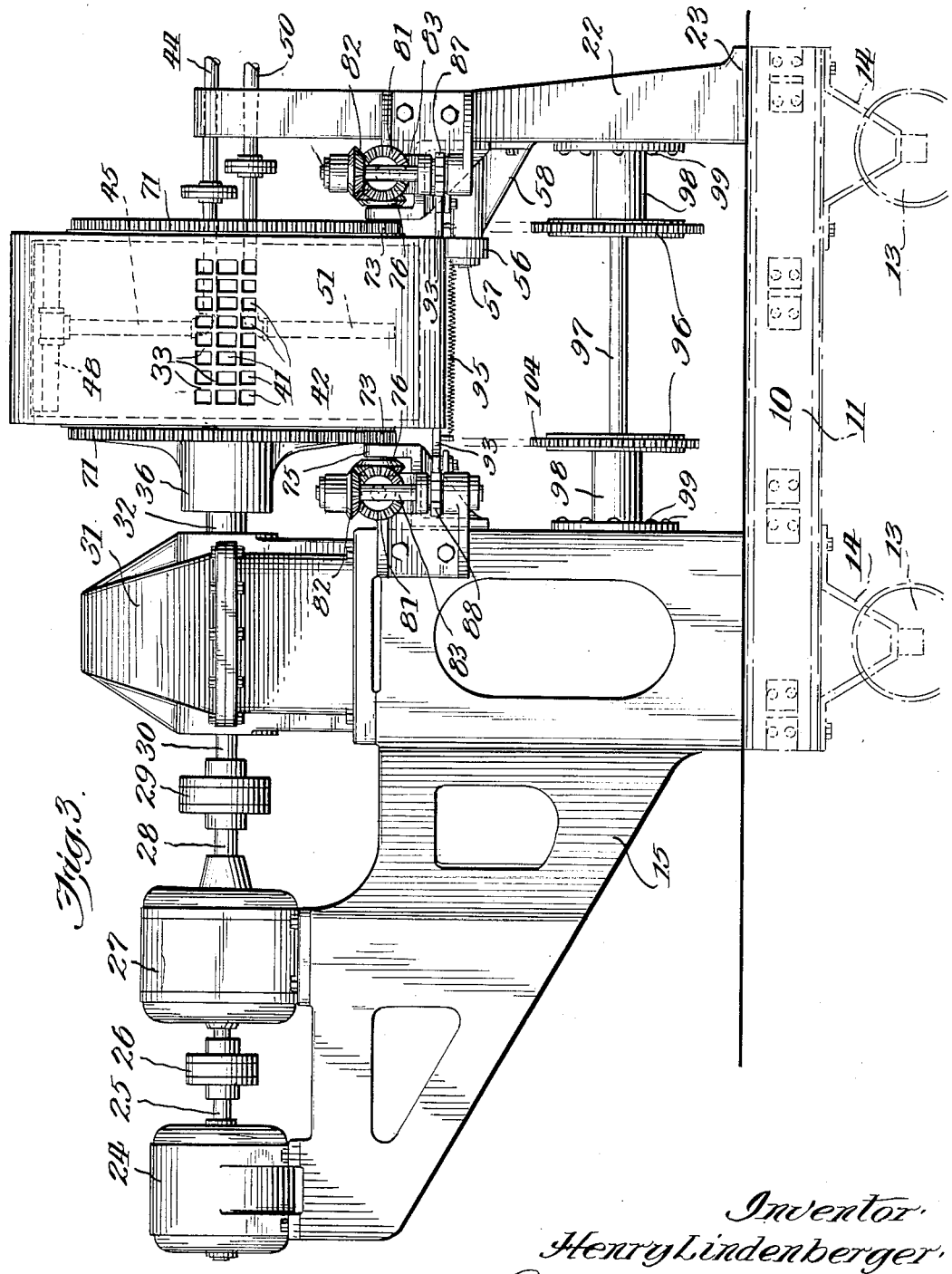

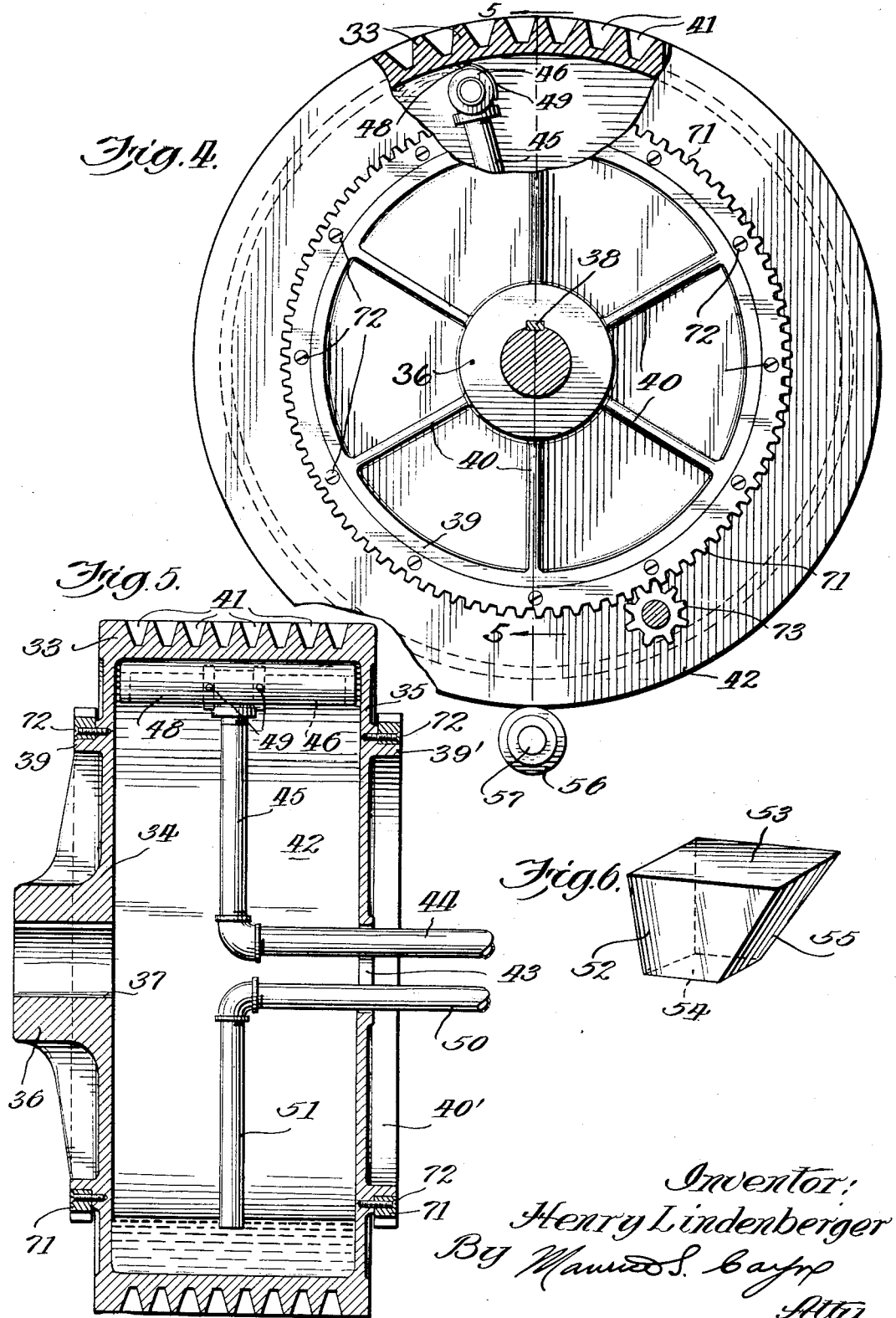

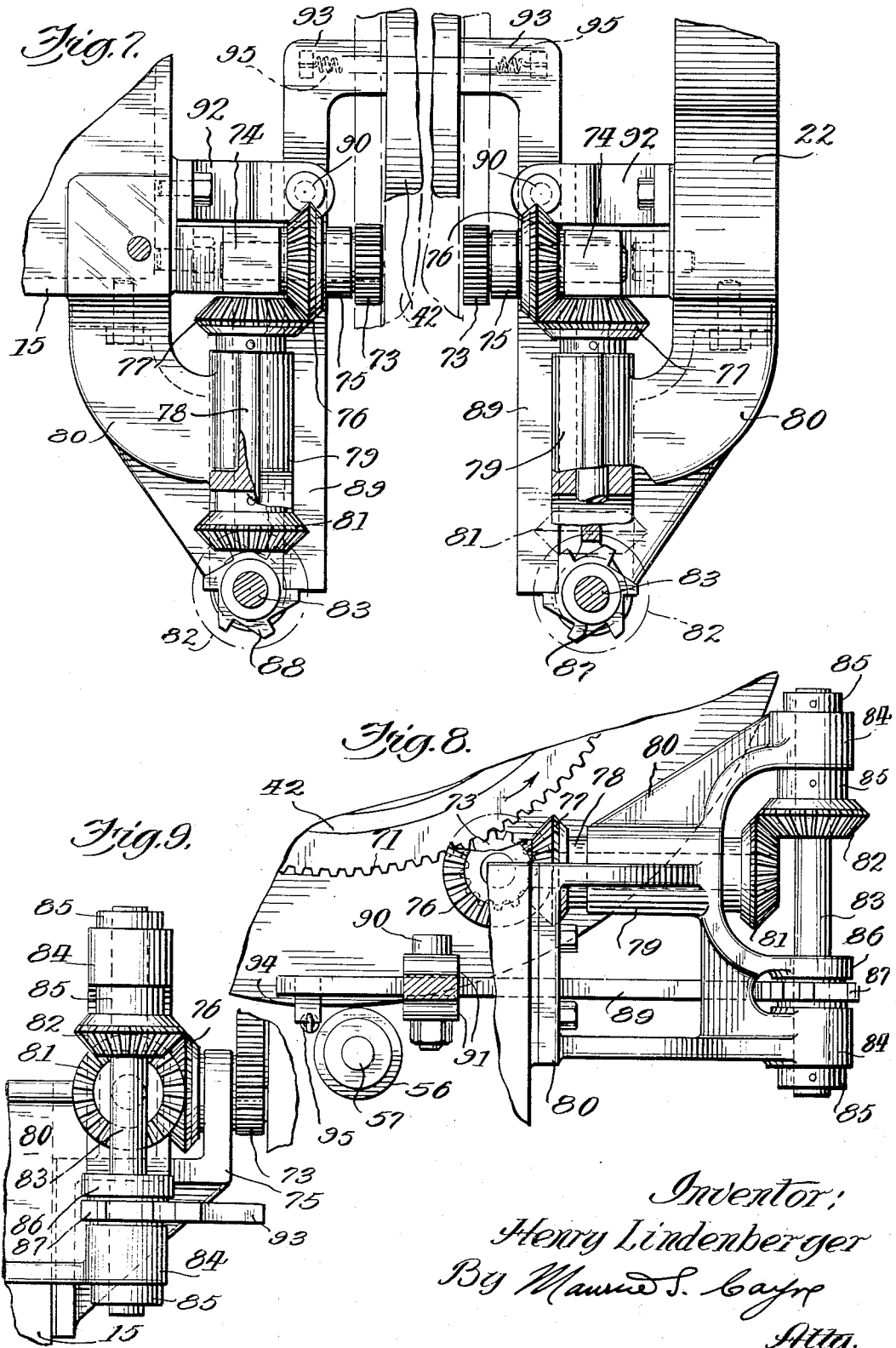

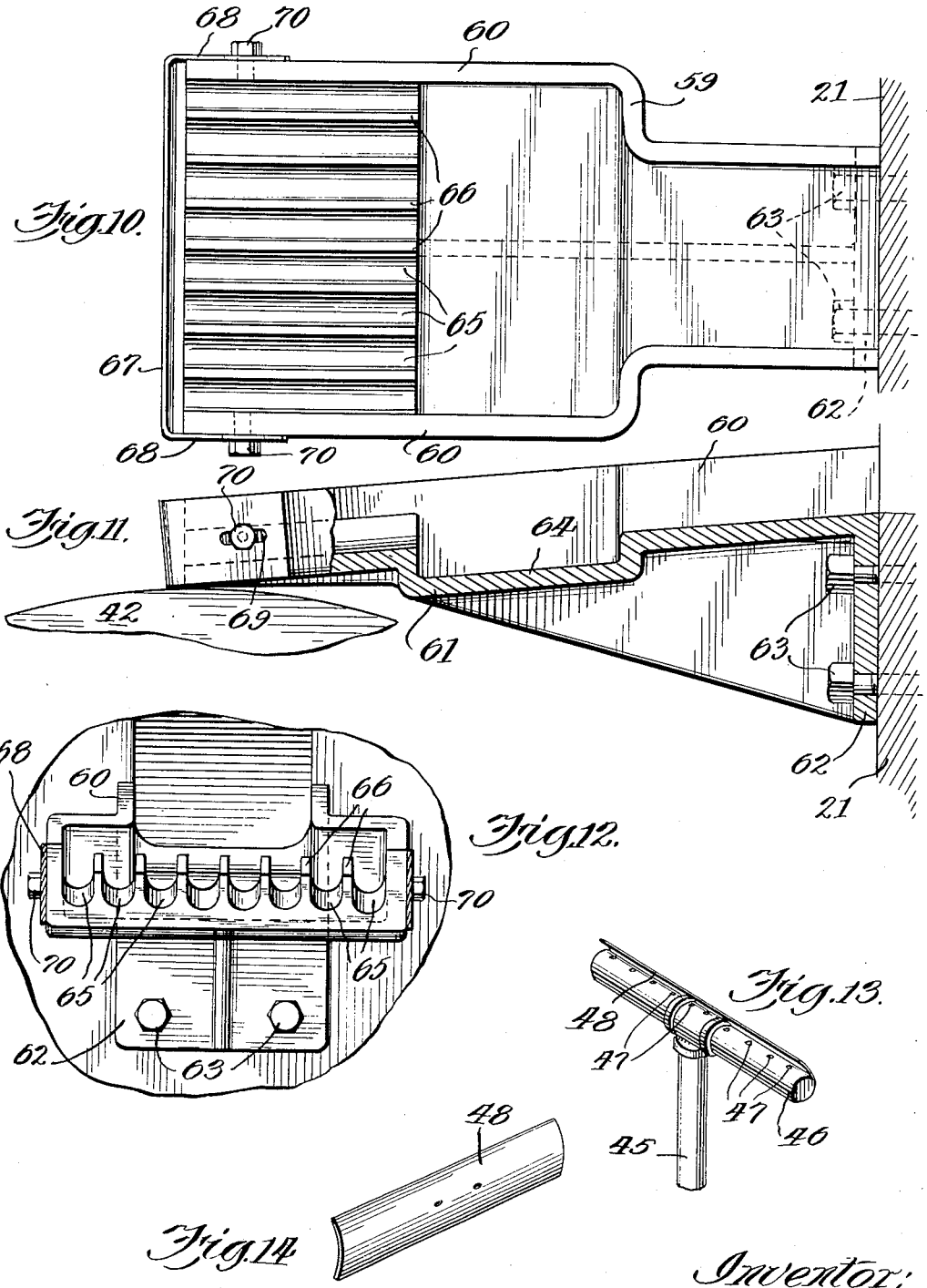

Patented Nov. 21, 1933

1,936,332

UNITED STATES PATENT OFFICE 1,936,332

MOLDING APPARATUS

Henry Lindenberger, Chicago, Ill.

Application February 13, 1931. Serial No. 515,443

8 Claims. (Cl. 22—75)

This invention relates to an apparatus for casting aluminum ingots, and similar metals capable of being cast in metal molds, and has for its object to provide an apparatus which is entirely automatic in its operation and obviates the necessity of hand labor from the melting furnace to the delivery of the finished cast.

At the present time the aluminum bullion from the smelters is cast in open flat molds successively filled through an open spout with the molten metal. The resulting cast consists of a plurality of small ingots joined together, which ingots must be severed in any suitable manner when it is desired to use the same in a quantity less than the amount contained in a complete mold. Also, because of the formation of the mold it has been difficult to obtain ingots of uniform size, shape and weight and because of the uncertainties of hand pouring, the resulting cast is frequently rough at its edges and since rough and irregular ingots are not as acceptable as when perfectly symmetrical, it is frequently necessary to trim the same by hand before removing from the mold. After the trimming operation the ingots are taken from the mold by hand and loaded on trucks by means of which they are conveyed to points of delivery.

By my improved apparatus the above objections are readily overcome with the result that perfectly symmetrical casts are obtained which casts are uniform in size and weight, having perfectly smooth surfaces on all sides thereof, thereby eliminating the necessity for trimming or in any way smoothing any of the surfaces of the cast, and after the cast has been cooled it is automatically delivered to a continuously moving conveyor which transports it to any desired point of delivery without hand operation.

An apparatus constructed according to my invention comprises essentially a frame; a wheel mold rotatably mounted in said frame in a vertical plane and provided on the outer periphery thereof with a plurality of rows of molds of suitable shape and size; suitable gearing mechanism is provided for rotating the wheel mold at the desired speed; a trough set above the wheel mold, and means for conveying the material of which the ingots are to be made, as for instance molten metal, to a trough and means for delivering the material from the trough into the wheel mold, corresponding to the speed at which the mold is being rotated; means for directing a supply of cooling water against the under side of said molds to facilitate in the cooling of the same, said molds being so disposed as to permit the emptying of the same by gravity, but also being provided with positive operating mechanism for striking the said wheel mold adjacent the lower edge thereof at predetermined intervals for causing a positive emptying of the molds and means disposed below said wheel mold for receiving the casts and for automatically transporting the same to any desired point of delivery without hand operation.

A further object of this invention is to provide an apparatus of the character described which will be entirely automatic in its operation, comprising a substantially self contained portable unit, including a rotatable wheel mold having a large number of molds provided on the periphery thereof, an improved mechanism for loosening the casts after reaching a predetermined point in the revolution of said wheel mold to facilitate in the emptying of said molds, and a continuously moving conveyor for automatically transporting said casts away from the wheel mold, and a single driving means for driving said wheel mold, loosening mechanism, and conveyor.

A still further object of this invention is to provide a machine of the character described which is entirely automatic in its operation and which comprises a rotatable hollow cylinder on the outer periphery of which are provided a plurality of molds, said cylinder being adapted for rotation in a vertical plane and being disposed below a suitable trough provided with a plurality of spouts by means of which the molten metal may be delivered to the molds, cooling means provided on the inside of said cylinder for cooling the under side of said molds after the same have received their supply of molten metal, means cooperating with said cylinder for loosening the casts in said mold adjacent the lower edge of said cylinder whereby said molds may be automatically emptied, and a continuously moving conveyor disposed below said wheel mold whereby it will receive the casts automatically delivered from said mold and transport the same to any desired point of delivery.

A still further object of this invention is to provide an apparatus of the character described which will be automatic and continuous in its operation, whereby a large number of casts may be made in a short period of time, which will be simple in construction, assembly and operation, and which will be highly efficient for carrying out the purposes for which it is designed.

With the foregoing and other objects in view which will appear as the description proceeds, the invention consists in certain novel features of construction, arrangement and combination of parts, hereinafter more fully described, illustrated in the accompanying drawings, and particularly pointed out in the appended claims, it being understood that various changes in the form, arrangement and minor details of construction may be made without sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, operation, and many of its advantages should readily be understood and appreciated.

Referring to the drawings, in which similar characters of reference are employed to indicate corresponding or similar parts throughout the several figures in the drawings:—

Figure 1 is a top plan view of an apparatus constructed in accordance with my invention;

Figure 2 is an end elevational view of the same;

Figure 3 is a side elevational view of the same;

Figure 4 is a side elevational view of my improved wheel mold, a portion thereof being broken away to illustrate the inside construction thereof;

Figure 5 is a sectional view through the wheel mold shown in Figure 4;

Figure 6 is a view in perspective of an ingot cast in my improved machine;

Figure 7 is a top plan view of an improved hammering mechanism for loosening the ingots cast in said wheel mold;

Figure 8 is a front view of the mechanism shown in Figure 7;

Figure 9 is an end view of the mechanism shown in Figure 7;

Figure 10 is a top plan view of an improved construction of trough for delivering the molten metal to the wheel mold;

Figure 11 is a longitudinal sectional view through the same, the forward end of the trough being shown in side elevation;

Figure 12 is a front end view of the trough shown in Figure 10;

Figure 13 is a view in perspective of the means for delivering the cooling medium to the inside of the wheel mold; and Figure 14 is a view in perspective of baffle plate associated with the means illustrated in Figure 13.

In carrying my invention into effect in the embodiment thereof, which I have selected for illustration in the accompanying drawings and description in this specification, I provide a suitable base member generally designated by the reference character 10, said base being constructed of the side members 11, which may be of I-beam construction, spaced from each other and held in assembled position by means of the cross-beams 12, to form a substantial and rigid base for supporting the mechanism to be presently more fully described. The said base may be mounted, if desired, on suitable wheels 13 by means of the brackets 14 provided adjacent each end of the sides 11 or in some other suitable manner. The provision of said wheels making it possible to move the apparatus as a unit from place to place and dispose it in position to receive the molten metal from the smelting furnace.

Upon the movable base 10, which is of substantially rectangular formation, is rigidly secured in any suitable and well known manner a supporting frame generally designated by the reference character 15, said frame being secured to the base 10 adjacent one end thereof and is adapted to extend beyond said end as shown more clearly in Figure 3 of the drawings. The frame 15 may be constructed of any suitable material, such for example as cast iron or the like, and may be of substantially box-like formation, open at its bottom portion and having the side walls 16 and 17, the top wall 18 and the rear wall 19. The lower portion of the frame 15 may be provided with the feet portions 20 by means of which the same may be rigidly secured to the side members 11 of the base 10. Obviously, if desired, the said feet portions 20 may be secured directly to the floor whereby the said frame will be permanently attached in place in position to support the molding mechanism, to be presently described, adjacent the furnace 21 in position to receive the molten metal therefrom. The said frame 15 is constructed of a shape substantially as shown in the drawings, the major portion thereof extending outwardly from the end of the base 10 to which it is secured and it is of a sufficiently rigid construction to receive thereon and to support in a rigid and secure manner the mechanism to be presently described. In order to lighten the construction of the frame suitably shaped openings, as shown in the drawings, may be provided in the side and top walls thereof.

Adjacent the other end of the base 10, is rigidly secured a vertically disposed frame member 22 by means of the feet 23, said member also being adapted for attachment to sides 11 of the base 10, or to the floor if it is desired to secure the apparatus in a permanent position on the floor. The frame 22 may also be constructed of cast iron or the like, and is provided, as shown, with a relatively heavy base portion and a somewhat lighter upper portion terminating in a rounded upper edge and is shaped substantially as shown in dotted lines in Figure 2. The two frame members 15 and 22 are arranged in such a manner as to support thereon in a compact and neat arrangement all of the mechanism going to make up the complete molding apparatus to be hereinafter more fully described, as well as the driving mechanism therefor, the hammering means, the cooling medium conveying means, and the continuous automatic conveying means. It is to be understood, however, that I do not limit myself to the specific shape, size and construction of frame members illustrated, as obviously any other construction of frame members may be employed so long as the same is of sufficient strength and rigidity to support the apparatus disposed thereon.

In the embodiment illustrated the driving mechanism for my molding machine may consist of a high speed motor 24, which is mounted at the forward end of the frame 15, on a portion especially provided therefor, said motor being of any standard and well known construction and being adapted for making approximately 1150 revolutions per minute. The free end of the shaft 25 driven by said motor 24, is connected by a flexible coupling 26 of usual and well known construction to a spur gear speed reducer 27, also of standard and well known construction, said reducer having a reducing ratio of approximately sixteen to one.

The shaft 28, driven by the reducer 27, is connected by means of a second flexible coupling 29, to a shaft 30, which shaft is connected by means of a suitable further speed reducer 31, which may also be of any well known and standard construction, such for example as the Herringbone type, the said last mentioned reducer having a reducing ratio of approximately seventy-two to one, whereby the speed of the shaft 32, which is connected by means of the reducer 31 with the shaft 30, will have a speed of approximately one revolution per minute. The low speed shaft 32 is adapted to extend beyond the end wall 19 of the frame member 15, and into the space between the frame members 15 and 22. The driving mechanism above described may be of any well known and standard construction, and as the same forms no part of the present invention, it is not thought necessary to describe the same in more detail.

Disposed between the frame members 15 and 22 and spaced therefrom and also from the base 10, is a vertically disposed hollow cylinder generally designated by the numeral 33, said cylinder forming the wheel mold which will now be more fully described. The cylinder 33 may be constructed of any suitable material, such for example as cast iron or the like, and has formed integral therewith the side walls 34 and 35, the wall 34 having provided thereon a central hub portion 36, said hub portion being of sufficient size and strength to carry the load on said wheel mold. The hub portion 36 has extending therethrough a central opening 37, by means of which the said cylinder may be rigidly mounted onto the end of the low speed shaft 32, said hub being shrunk onto the said shaft in the usual and well known manner. A key 38, may be provided between the shaft 32 and the hub 36, for securely locking the cylinder to the shaft, whereby the said cylinder will rotate with said shaft.

In order to strengthen the side wall 34 of the cylinder, the same may be provided with the annular flange portion 39, connected to said hub 36 by means of a plurality of veins or ribs 40. A similar annular flange 39' having formed integral therewith the inwardly extending ribs 40' is also provided on the other side wall 35 of said cylinder. In addition to strengthening the said side walls of the cylinder the annular flanges 39 and 39' have an added function which will be hereinafter described.

The outer periphery of the cylinder 33, is provided on substantially the entire surface thereof with a plurality of annular rows of outwardly open molds 41, said molds being arranged, as shown, in equi-distant rows and equi-distantly from each other in each row, thus presenting a plurality of transverse rows of molds, which rows are, of course, equally spaced from each other and in which all of the molds are properly aligned with each other. The said rows of individual molds are so arranged that upon the rotation of the cylinder, successive transverse rows of said molds will be brought to a position to be simultaneously filled with molten metal at a predetermined point in the revolution of said cylinder. As already stated, the interior of the cylinder is hollow so as to form therein a compartment 42, within which is adapted to be introduced a suitable cooling medium, such for example as water or the like, for facilitating in the cooling and hardening of the material disposed in the individual molds 41. As shown in Figure 5 of the drawings, the side wall 35 of the cylinder is provided with a central opening 43, through which a pipe 44 may be introduced into the compartment 42, said pipe terminating on the inside of the cylinder in an angularly disposed pipe portion 45, which latter portion terminates in a T portion extending substantially across the full width of the cylinder and being disposed adjacent the upper end of said cylinder. The horizontal portion of said T portion is provided with a plurality of spaced openings 47, through which the cooling medium may issue to form a spray against the underside of the outer wall of the cylinder.

As shown in Figure 4 of the drawings, the portion 45 is disposed at a point in front of the vertical axis of the cylinder so that the cooling medium will not strike the cylinder wall until after the cylinder has passed its highest point in its revolution. The reason for this is to be presently explained. Any suitable baffle plate 48, may be secured in any suitable manner, such for example as by means of the screws 49, to the T portion 46, whereby the water issuing from said pipe 46 will be deflected and directed towards the left hand side of the cylinder, as viewed in Figure 4.

A pipe 50, also introduced into the interior of the cylinder 33, through the opening 43, is provided, said pipe terminating in an angular disposed pipe portion 51, the lower edge of which extends to a point adjacent the lower wall of the compartment 42, said pipe being adapted for conducting away the cooling medium from the interior of the cylinder. Any suitable construction of pumping mechanism (not shown) may be employed for supplying the cooling medium to and returning the same from the compartment 42. It will also be noted, as shown in Figure 3 of the drawings, that the said pipe sections 44 and 50 are supported in their operative position in the upper edge of the frame member 22. Thus it will be apparent that a constant circulation of water or other suitable cooling medium is had within the interior of the cylinder for assuring a proper cooling of the under face of the outer wall of said cylinder.

Obviously, any desired shape of mold may be provided for receiving the molten metal, and in the embodiment illustrated the finished ingot or cast is shown in perspective in Figure 6, the same being designated generally by the numeral 52. The said ingot has a top wall 53 which is of substantially square formation and the bottom wall 54, which is also of substantially square formation, but of lesser size, the said top and bottom walls being joined by the uniformly tapering side walls 55. The taper of said walls is such as to permit the ready emptying of the molds by gravity as the said molds reach their lowermost point in the rotation of the cylinder.

Although the cylinder may be wholly supported on the slow speed shaft 32, to which it is rigidly secured for rotation therewith, still in order to further support the opposite end of said cylinder, there may be provided a horizontally disposed roller 56, carried on the free end of a shaft 57, which shaft may be rigidly secured in a suitable bracket 58, which bracket will be either formed integral with the frame 22 or which may be rigidly secured thereto in any suitable and well known manner. The free edge of the cylinder 33, disposed adjacent said roller 56 is adapted to ride thereon, as shown more clearly in Figures 3 and 4 of the drawings, the size and arrangement of the roller 56 being such as not to interfere with the emptying of the molds as said roller is disposed in a position to be spaced from the outer annular row of molds.

In order to simultaneously fill each transverse row of molds as the same reaches a predetermined point in the rotation of the cylinder, I provide the improved trough construction generally designated by the reference character 59, which trough may be formed of any suitable material, such for example as cast iron or the like. The trough 59 is open at its forward end and is provided with the side walls 60, the bottom 61, and the downwardly extending portion 62 adjacent its rear end, by means of which it may be rigidly secured to the furnace wall 21, such for example as by means of the fastening bolts 63, in which position the said trough will be disposed so as to receive the molten metal issuing from the furnace. The bottom wall 61 of the trough may be disposed in an inclined position to facilitate the flow of the metal, and is provided intermediate its ends with a depressed portion or sump 64. That portion of the lower wall extending beyond the sump 64 is provided with a plurality of longitudinal grooves 65, said grooves being separated from each other by longitudinal rib portions 66 and are adapted to form a plurality of spouts, each one of which is disposed above an annular row of molds on the cylinder 33 and in position to fill said molds with the molten metal issuing therefrom, there being one such spout or groove for each annular row of molds. Thus, when the apparatus is disposed in operative position adjacent the furnace wall, the free end of the trough 59 will be at a point directly above the highest point of the cylinder, so that as soon as a transverse row of said molds reaches said highest point, all of the molds in said row will be simultaneously filled with molten metal, each mold 41 being supplied from its corresponding groove or spout disposed directly above it.

The volume of the flow of the metal must, of course, be adjusted correspondingly to the size of the ingots to be produced and to the speed at which the cylinder 33 is rotated. When this is effected, the production of these ingots or castings will proceed automatically, and without interruption, as long as a sufficient supply of metal is conveyed into the trough 59. This is virtually the main part of the operator's duty, to see to it, that an ample supply of molten metal is conveyed to the trough.

In order to prevent the depositing and hardening of any metal on the surface of the cylinder between the individual molds 41, there is provided a suitable scraper 67, which may be in the form of a plate member of any suitable material, such as steel or the like, said plate member extending across the full width of the open end of the trough 59, and having the ends thereof turned inwardly to provide the arms 68, by means of which it may be secured to the side walls 60 of the trough. The said arms 68, may be provided with the elongated slots 69, through which are adapted to extend the bolts 70, by means of which the said scraper may be secured in an adjustable manner on the free end of the trough. A shown in Figure 2 of the drawings, the scraper 67 is so disposed relative to the cylinder as to ride on the outer surface thereof as the cylinder rotates. Thus, any material deposited on the cylinder in the spaces provided between the individual molds, the same will be scraped off and deposited in the next transverse row of molds that is presented below the trough to be filled therefrom. In this way, not only will there be prevented the depositing and hardening of any metal on the cylinder wall, but also the free upper face of the finished casting or ingot will have been trimmed by the scraper to produce a smooth surface, as well as assuring a uniform size and weight for each ingot or casting, since all surplus material deposited in any mold will be removed therefrom as the same passes under the scraper 67.

As stated above, the shape of the finished ingot or casting is such as to permit the emptying of the molds by a gravity. However, in order to assure the positive emptying of said molds before they have passed the lowermost point in the rotation of the cylinder, there is provided in the embodiment illustrated an actuating mechanism adapted for forcefully striking against the side walls of the cylinder adjacent the lower edge thereof for jarring the same to loosen any castings that may have stuck in their molds.

As shown in the drawings there are provided two such hammering means, one for each side wall of the cylinder, and as the construction of both of said means is identical, only one of said means will be described in detail, the construction of the other being exactly the same.

Mounted on each of the annular flanges 39 and 39' provided on the side walls of the cylinder 33, is a ring gear 71, said ring gear being rigidly secured to its adjacent cylinder wall by means of a plurality of screws 72 extending through said gear and into the cylinder wall, or in some other suitable manner. The ring gear 71 is disposed so as to be in constant mesh with a spur gear 73, the latter being rigidly mounted on the free end of a shaft 74, a bearing for which shaft is provided in a suitable bracket 75 secured to its adjacent frame member 15 or 22. Carried by said shaft 74 intermediate the ends thereof and adapted for rotation therewith is a mitre gear 76, which is disposed so as to be in constant mesh with a second mitre gear 77, arranged at right angles thereto, and which is rigidly mounted on the free end of a shaft 78, which shaft is disposed in a bearing 79 provided therefor, in a suitable bracket 80, which bracket is also secured in any suitable manner to its adjacent frame member 15 or 22. The other end of said shaft 78 has rigidly mounted thereon a mitre gear 81, which is disposed so as to be in constant mesh with another mitre gear 82, rigidly mounted on a shaft 83, intermediate the ends thereof, the said shaft 83 having the ends thereof received in bearings 84 provided in arms extending from said bracket 80. Suitable collars 85, are rigidly mounted on the shaft 83, adjacent each end of the bearing 84 for holding the same in proper operative position.

A bearing arm or collar 86, is also provided on said bracket 80, said arm having the shaft 83 extending therethrough and is spaced from the adjacent bearing arm 84. That portion of the shaft 83 disposed between said spaced arms 84 and 86, has provided thereon a ratchet wheel 87 which is rigidly secured thereto for rotation therewith. A plurality of suitably shaped cam teeth 88 are provided on the circumference of said ratchet wheel, said teeth being arranged to have a portion thereof engage and ride one end of a pivotally mounted hammer 89, to actuate the same to swing it about its pivot. The hammer 89, as shown in the drawings, is pivotally mounted intermediate its ends on a stud 90, which stud is carried in a pair of ears 91, provided at the free end of a bracket 92, which bracket may be rigidly secured in any suitable manner to its adjacent frame member 15 or 22. The hammer 89 is adapted for pivotal movement about the stud 90 and is provided at its inner end with a right angled inwardly extending portion 93, the free end of which portion is adapted to strike against the adjacent wall of the cylinder 33. The pending lugs 94, are provided on said portions 93, said lugs having secured to them the free ends of a coil spring 95, which spring extends across and below the cylinder 33 and is adapted to normally urge the said portions 93 towards each other so as to engage their adjacent side walls of the cylinder.

Thus it will be noted that upon the movement of the cylinder rotation will be imparted through the intermediate gearing 71, 73, 76, 77, 81 and 82 to ratchet wheels 87, which will rotate in a direction to cause the teeth 88 thereof to engage and ride along the outer ends of the hammers 89 to move the same about their pivots and against the action of the spring 95, thereby moving the striking portions 93 away from each other and also away from its adjacent cylinder wall. As soon as the tooth 88, which is in engagement with the end of the hammer 89, has completed its riding movement on the end portions of the said hammers, the striking portions of said hammers will be forced by the action of the spring to move towards each other and to forcefully strike against their respective side walls of the cylinder, imparting a jarring movement to the latter. The frequency of the blows directed against the side walls of the cylinder will, of course, depend upon the number of teeth provided on the ratchet wheels and on the speed of rotation of the same. Also the force of the blow will depend upon the nature and shape of the cam surfaces provided on the teeth 88. By connecting the striking portions 93 of the hammers to each other by means of the coil spring 95, there is provided for the simultaneous striking of said portions against the cylinder, resulting in the more telling effect on the same and assuring the positive emptying of any mold that may have had the cast or ingot stuck to the walls thereof.

In order to continuously and automatically carry away the castings delivered from the wheel mold there may be provided any conveying means that may be suitable for the purpose. In the embodiment illustrated I have shown what is generally known as a double beaded flight conveyor, said conveyor comprising a pair of sprockets 96, disposed for rotation with a shaft 97, the free ends of which shaft are mounted in bearings provided therefor in members 98, which members are rigidly secured by suitable fastening means 99 to their adjacent frame members 15 and 22. Secured also in a rigid manner to frame members 15 and 22 are a pair of side frame members and tracks 100, the free ends of said side members 100 extending outwardly from the base 10 and are provided with the oppositely disposed bearing members 101, in which are mounted the free ends of a shaft 102, upon which shaft are rigidly mounted for rotation therewith a pair of sprockets 103, similar to the sprockets 96 carried by the shaft 97. Suitable roller chains 104 are mounted on the sprockets 96 and 103. On the shaft 102 is rigidly mounted another sprocket 105, which is connected by means of the roller chain 106 to a sprocket 107, which latter sprocket is rigidly secured on the free end of the shaft 30 for rotation therewith. The roller chains 104 are adapted to carry a plurality of conveying buckets 108, in which are adapted to be received the castings 52, as the latter are emptied from their molds 41. The entire conveying means are so arranged as to travel past the lower portion of the cylinder 33 at a speed which will make it possible for it to receive all of the castings delivered to it from the cylinder. Any suitable container, not shown, may be provided adjacent the free end of the conveyor for receiving the castings delivered by the conveyor. As the specific construction of the conveyor illustrated forms no part of the present invention it is thought not necessary to describe the same in more detail.

The operation of my improved apparatus will now be described. The mold wheel or cylinder 33 is rotated slowly to carry the transverse rows of molds provided thereon successively past the trough 59, through which the said molds are filled. The speed of the cylinder and the volume of flow of metal from the trough are such that the whole of the transverse row of molds are substantially filled by the time said row has passed beyond the free end of the trough. The scraper plate 67 will remove any surplus material that may have been deposited on the space provided between the individual molds, said surplus material being carried by the scraper plate into the molds of the next transverse row that present themselves beneath the trough to be filled. The filled molds are then permitted to travel a short distance before their lower walls are subjected to the cooling medium. This is to permit the molten metal to begin to solidify gradually at first, but as soon as the initial set of metal has taken place, the same will be brought into contact with the cooling stream issuing from the pipe 46 and continued circulation of the water in the interior of the cylinder will rapidly reduce the temperature of the metal so that by the time the molds reach a point adjacent the lower edge of the cylinder the casts therein are ready to drop from their molds.

The rotation of the cylinder will cause a constant oscillation of the hammers 89 whereby a hammering action will be imparted against the side walls of the cylinder adjacent the lower portion thereof, said hammering action being of sufficient force to cause a jarring of the cylinder and will be effective in loosening any of the casts that may have stuck to the walls of the molds. It will be noted that because of the rigid construction of the cylinder, the hammering action directed against the lower edge thereof will not be transmitted to the upper portion thereof and thereby interfere with the proper filling of the molds at that point. However, it is believed that should any of said jarring action be transmitted to the upper portion of the cylinder the same may have a helpful effect in causing a more solid packing of the metal in the molds since it will prevent the formation of any voids therein. As the individual casts or ingots are emptied from their molds, the same are received in the conveying buckets 108 and are carried away thereby to a suitable place of deposit.

Thus it will be noted that the operation of the improved apparatus is practically automatic in all respects, the production of the casts proceeding continuously and without interruption as long as a sufficient supply of metal is conveyed into the trough from the furnace. By reason of this continuous and automatic operation of the apparatus a great number of casts may be made in a comparatively short period of time and with the elimination of practically all hand labor. Also, it will be noted that the resulting casts will be all of uniform size, weight and shape, which is an important feature in the saleability of merchandise of this character.

It is believed that my invention, its mode of construction, assembly and operation, and many of its advantages should be readily understood from the foregoing without further description, and should also be manifest that while a preferred embodiment of the invention has been shown and described for illustrative purposes, the structural details are, nevertheless, capable of wide variation within the purview of my invention as defined in the appended claims.

What I claim and desire to secure by Letters Patent of the United States is:—

1. An apparatus for the casting of metal ingots comprising a frame, a hollow cylinder rotatably mounted on said frame for rotation in a vertical plane, a series of outwardly open pig molds formed on the outer periphery of said cylinder, said molds being arranged in successive transverse rows, a trough containing molten metal supported above said cylinder, a series of open spouts corresponding in number to the number of molds in each transverse row provided at the free end of said trough, said spouts being adapted for completely filling the molds in any one row as said row of molds travels past the same, means provided on the inside of the cylinder for directing a spray of cooling medium against the bottom walls of the molds, means for carrying away the cooling medium discharged into the interior of the cylinder, means for causing the emptying of said molds by gravity, and means for periodically striking said cylinder on both sides thereof to loosen any castings that may have stuck in their molds, whereby the same may be caused to be discharged before the said molds have passed a given point in their path.

2. In an apparatus of the character described, the combination of a hollow cylinder having on its periphery a series of outwardly open pig molds arranged in transverse rows spaced from each other, the molds in each row being also arranged in spaced relation, means for rotating said cylinder in a vertical plane, a trough containing molten metal supported above the cylinder, said trough being adapted for completely filling simultaneously each mold in any transverse row as said row travels past said trough, a scraper member adjustably supported by said trough and being positioned to engage the outer periphery of said cylinder to remove therefrom any metal that may have been deposited thereon outside of the said individual molds, said scraper being effective for causing said removed metal to be deposited in the next successive transverse row of molds that presents itself below said trough.

3. In an apparatus of the character described, the combination of a mold wheel having on its periphery a series of outwardly open molds arranged in successive transverse rows, means for rotating said mold wheel, a trough for supplying molten metal disposed above said wheel, said trough being adapted to completely fill the molds as the same travel past said trough, and means for causing the emptying of said molds by gravity, said last mentioned means including a pivotally mounted hammer, which is adapted to intermittently strike said wheel mold on both sides thereof to loosen any castings that may have stuck in their molds, the intermittent striking action of said hammer being imparted to it by the rotary movement of said wheel mold.

4. In an apparatus of the character described, the combination of a hollow cylinder substantially closed at its ends and having on its periphery a series of outwardly open pig molds, means for rotating said cylinder in a vertical plane, a trough containing molten metal supported above the cylinder, said trough being adapted to completely fill the molds with molten metal as said molds travel past said trough, and means for causing the emptying of said molds by gravity, said last mentioned means including a pair of pivotally mounted hammers arranged one adjacent each end of said cylinder at the lower edge thereof, said hammers being adapted for intermittently striking the said ends of said cylinder for the purpose of loosening any castings that may have stuck in their molds, said hammers being actuated by the rotary movement of said cylinder.

5. In an apparatus of the character described, the combination of a carrier provided with a plurality of molds, means for successively filling said molds with molten metal, means for causing the emptying of said molds by gravity, said last mentioned means including pivotally mounted hammers adapted for intermittently striking said carrier on both sides thereof for loosening the castings in their molds, a continuously moving conveyor disposed below said carrier and in position to receive the castings discharged therefrom, and a single means for driving said carrier, hammer actuating means, and conveyor.

6. In an apparatus of the character described, the combination of a rotatable hollow cylinder provided with a plurality of spaced rows of outwardly open molds and means for successively filling said molds as the same travel past a given point in their path, said last mentioned means comprising a trough open at its forward end and having an inclined bottom wall provided with a depressed portion intermediate the ends thereof, that portion of the bottom wall extending beyond said depressed portion being provided with longitudinally spaced grooves, said grooves being separated from each other by upwardly extending longitudinal ribs, the flow of metal through each groove being sufficient to completely fill a single mold in the time that it takes said mold to travel past said trough, and means associated with said trough for engaging the outer periphery of said wheel mold for removing the surplus metal from said molds.

7. An apparatus for casting metal ingots comprising a frame, a hollow cylinder rotatably mounted on said frame, a series of outwardly open pig molds formed on the outer periphery of said cylinder, a trough containing molten metal supported above said cylinder and in position to completely fill the molds as they travel past said trough, means for intermittently striking said cylinder on both sides thereof to cause the emptying of said molds by gravity, a continuously moving conveyor supported on said frame and arranged in position to receive the castings discharged from said cylinder, a single driving means for rotating said cylinder, for actuating said striking means, and for moving said conveyor, and a portable base for supporting all of the above mechanism in operative relation.

8. In an apparatus for casting metal ingots, the combination of a hollow cylinder provided with a plurality of spaced rows of outwardly open molds on the outer periphery thereof, means for rotating said cylinder, means for successively filling the molds in each row with molten metal as said molds pass a given point in their path, means on the interior of said cylinder for directing a spray of cooling fluid against the bottom walls of said molds, said last mentioned means including a transversely disposed pipe portion having a plurality of spaced openings through which the cooling fluid is adapted to issue, and a baffle plate extending across the full length of said pipe portion, secured thereto, said baffle plate being effective for deflecting and directing the spray issuing from said pipe portion towards a given point on the interior of said cylinder.

HENRY LINDENBERGER.